United States Patent [19]

Schneider et al.

[11] Patent Number: 4,856,263

[45] Date of Patent: Aug. 15, 1989

[54] SYSTEM FOR LOADING PATTERNS OF ARTICLES INTO CONTAINERS

[75] Inventors: Thomas C. Schneider, Oak Forest; James J. Diver, South Holland, both of Ill.

[73] Assignee: Advanced Pulver Systems, Inc., Chicago Ridge, Ill.

[21] Appl. No.: 61,732

[22] Filed: Jun. 15, 1987

[51] Int. Cl.⁴ .............................................. B65B 5/08
[52] U.S. Cl. ...................................... 53/543; 53/247; 53/250; 53/251; 198/779; 414/492; 414/794.1; 414/794.3; 414/794.8; 414/794.9; 414/799
[58] Field of Search ................ 53/250, 251, 247, 543; 198/779; 414/57, 67, 790.3, 794.1, 794.3, 794.8, 794.9, 792, 799

[56] References Cited

U.S. PATENT DOCUMENTS

| | | | |
|---|---|---|---|
| 2,815,870 | 12/1957 | Laub | 414/45 |
| 2,994,171 | 8/1961 | Arvidson | 53/251 X |
| 3,209,512 | 10/1965 | Ferguson, Jr. et al. | 53/543 X |
| 3,383,833 | 5/1968 | Pearson | 53/250 X |
| 3,432,045 | 3/1969 | Bauer | 414/280 |
| 3,770,096 | 11/1973 | Stohlquist | 198/779 X |
| 4,030,620 | 6/1977 | Euverard et al. | 53/473 |
| 4,522,292 | 6/1985 | Euverard et al. | 198/374 |
| 4,720,959 | 1/1988 | Robinson et al. | 53/251 X |

Primary Examiner—Robert J. Spar
Assistant Examiner—Janice Krizek
Attorney, Agent, or Firm—Emrich & Dithmar

[57] ABSTRACT

A system for loading groups of articles into containers includes an infeed conveyor which groups the articles into subgroups which are then selectively reoriented by a turntable-type orienting device. The oriented subgroups are then conveyed to a transfer area where they are accumulated into elements of a predetermined pattern of articles. A pusher sequentially pushes the pattern elements onto the lower reach of a window conveyor disposed at a loading station. A container conveyor runs beneath the window conveyor to deliver an empty container to the loading station, a lifter assembly then raising the empty container to a loading position immediately beneath the support reach. The window conveyor is then operated to drop the pattern of articles through the window thereof into the container. As the window conveyor continues its movement a pusher on the leading end of the conveyor section thereof pushes the loaded container onto a discharge slide assembly which then tilts downwardly to allow the filled container to the slide onto an outfeed conveyor which may convey loaded containers to downstream apparatus, such as a bottom-up stacking mechanism.

19 Claims, 11 Drawing Sheets

Microfiche Appendix Included
(74 Microfiche, 1 Pages)

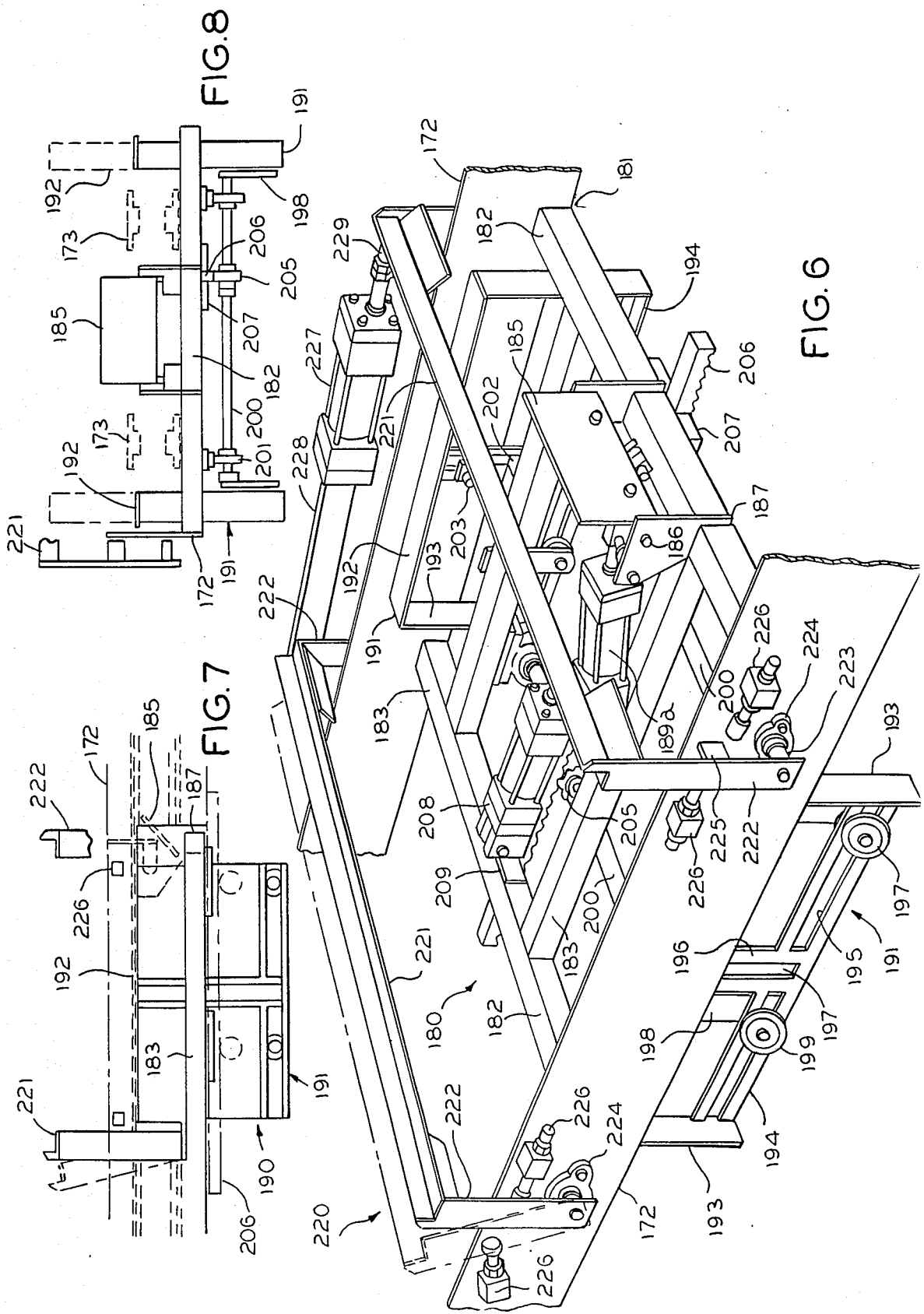

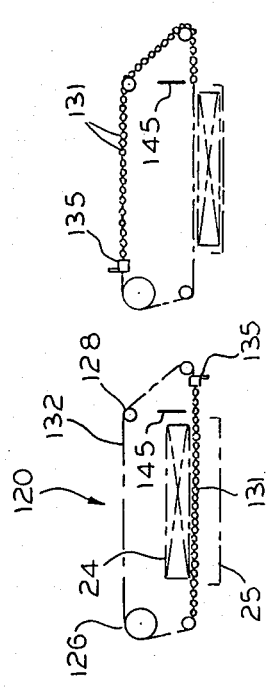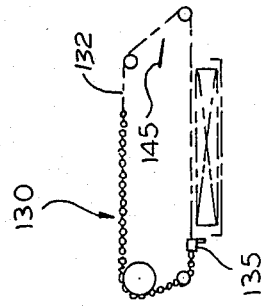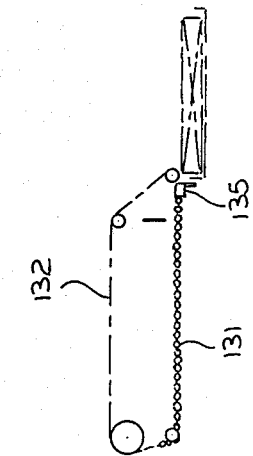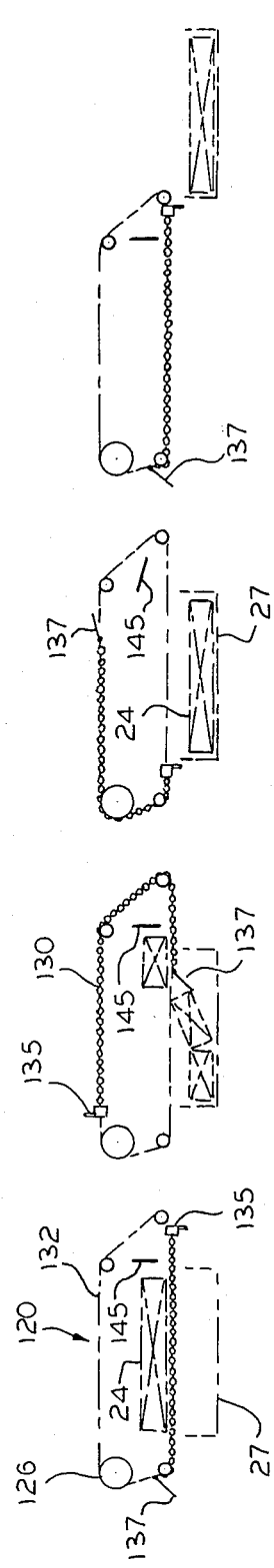

SYSTEM FOR LOADING PATTERNS OF ARTICLES INTO CONTAINERS

MICROFICHE APPENDIX

There is submitted herewith a Microfiche Appendix setting forth in "rung logic" notation a listing of computer programs for operating the control circuits 250 and 300 for the product handling system 30 and the container handling system 170, respectively.

BACKGROUND OF THE INVENTION

The present invention relates generally to improvements in apparatus and methods for loading articles into a container. More specifically, the invention relates to the loading into a container of a group of articles which are to be maintained in a predetermined pattern or relationship with respect to one another. The invention has particular application to the loading of pliable packages of fragile items, such as bakery goods, into containers such as trays or baskets.

In a modern bakery plant, bakery products such as bread, rolls or the like are typically handled along a production line. For example, in the production of loaves of sliced bread, the loaves come from an oven, pass through a cooling station then go through a slicing station, a bagger and finally to a container loader for loading the bags of sliced bread into containers such as trays, baskets or the like. The loaded containers may then be stacked or undergo other handling prior to warehousing or shipping. Ideally, a bakery will run a plurality of such production lines simultaneously in parallel. The various lines may be producing identical product or different lines may be producing different variations of the product. For example, different lines may be packaging the product in bags or packages bearing different labels for different customers. Each of the simultaneously-operating production lines must be serviced with container handling systems for delivering empty containers to the production line and removing filled containers therefrom. It is highly desirable to be able to service all of the production lines by the same container handling system.

One prior type of container loading apparatus is disclosed, for example, in U.S. Pat. No. 4,522,292 issued to Euverard et al. That system utilizes a turntable-type orienter for orienting groups of packaged articles and forming then into predetermined patterns. The patterns are then moved onto a loading plate which is retracted against a stop to drop the pattern of articles onto a set of retractable pins which extend upwardly through holes in the bottom of an empty container. The pins are retracted to lower the pattern of articles into the container. The containers are fed to and removed from the loading station in a direction parallel to the direction of movement of the articles along the production line. Thus, this arrangement does not lend itself to a plurality of such loading systems being serviced by the same tray handling system.

Another type of container loader is disclosed in U.S. Pat. No. 4,030,620 to Euverard et al., in which the retractable plate is replaced by a window conveyor. The window conveyor forms an endless vertical loop, the product being delivered onto the upper reach of the loop and the retractable-pin container loading device being disposed inside the loop. The patent does not disclose the tray handling apparatus, but it is clear that the trays must be moved to and from the loading position in directions laterally of the window conveyor. Such an arrangement can serve only one production line at a time, because once the tray is in the loading position, no other trays can pass therethrough to other production lines. Vertical movement of the trays is prohibited by the vertically reciprocating pin arrangement.

Other types of loading systems represented, for example, by U.S. Pat. No. 2,815,870, utilize a window conveyor for loading pallets. But the pallets are moved vertically at the loading station while they are being loaded, thereby preventing empty containers from passing through the loading station to other production lines duirng the loading operation.

SUMMARY OF THE INVENTION

It is a general object of the invention to provide an improved container loading system which avoids the disadvantages of prior loading sytems, while affording additional structural and operating advantages.

An important feature of the invention is the provision of a container loading apparatus which is uniquely adaptable to a plurality of such apparatuses being operated in tandem so that they can be serviced by a common container handling system in a pass-through mode of operation, whereby during the time when a container is being loaded by the apparatus, other containers can be passing through to adjacent apparatuses.

In connection with the foregoing features, it is another feature of the invention to provide an improved loading apparatus of the type set forth which is capable of rapid and accurate operation under program control.

It is another feature of the invention that there is provided a system which incorporates the loading apparatus of the type set forth in combination with infeed apparatus for forming groups of articles into predetermined patterns for loading into the containers, and apparatus for receiving and stacking filled containers.

These and other features of the invention are attained by providing apparatus for loading product into a container comprising: support means for holding a container in a loading position, endless loading means movable along an endless path having a substantially horizontal lower reach disposed immediately above the loading position, the loading means including a conveyor section for supporting product and a window section for allowing product to drop therethrough, transfer means for moving product onto the conveyor section when it is disposed along the lower reach of said endless path, shifting means responsive to movement of the loading means in a predetermined direction along the path for shifting the product from the conveyor section through the window section and into a container supported in the loading position, and discharge means carried by the loading means and responsive to continued movement thereof along the path for moving the loaded container from the loading position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings a preferred embodiment thereof, from an inspection of which, when considered in connection with the following description, the invention, its construction and operation, and many of its advantages should be ready understood and appreciated.

FIG. 6 is an enlarged, fragmentary, perspective view of the lower portion of the apparatus illustrated in FIG. 4, comprising the container lifter assembly;

FIG. 7 is a reduced, fragmentary, side elevational view of the lifter assembly illustrated in FIG. 6;

FIG. 8 is a reduced, fragmentary, end elevational view of the lifter assembly of FIG. 6;

FIGS. 10A-10D are partially diagrammatic, front elevational views of the window conveyor of the loader assembly in accordance with a first embodiment of the present invention, illustrating the apparatus in various positions during a container loading sequence;

FIGS. 11A-11D are views similar to those in FIGS. 10A-10D, illustrating an alternative embodiment of the present invention;

DESCRIPTION OF THE PREFERRED EMBODIMENTS

Figure 1:
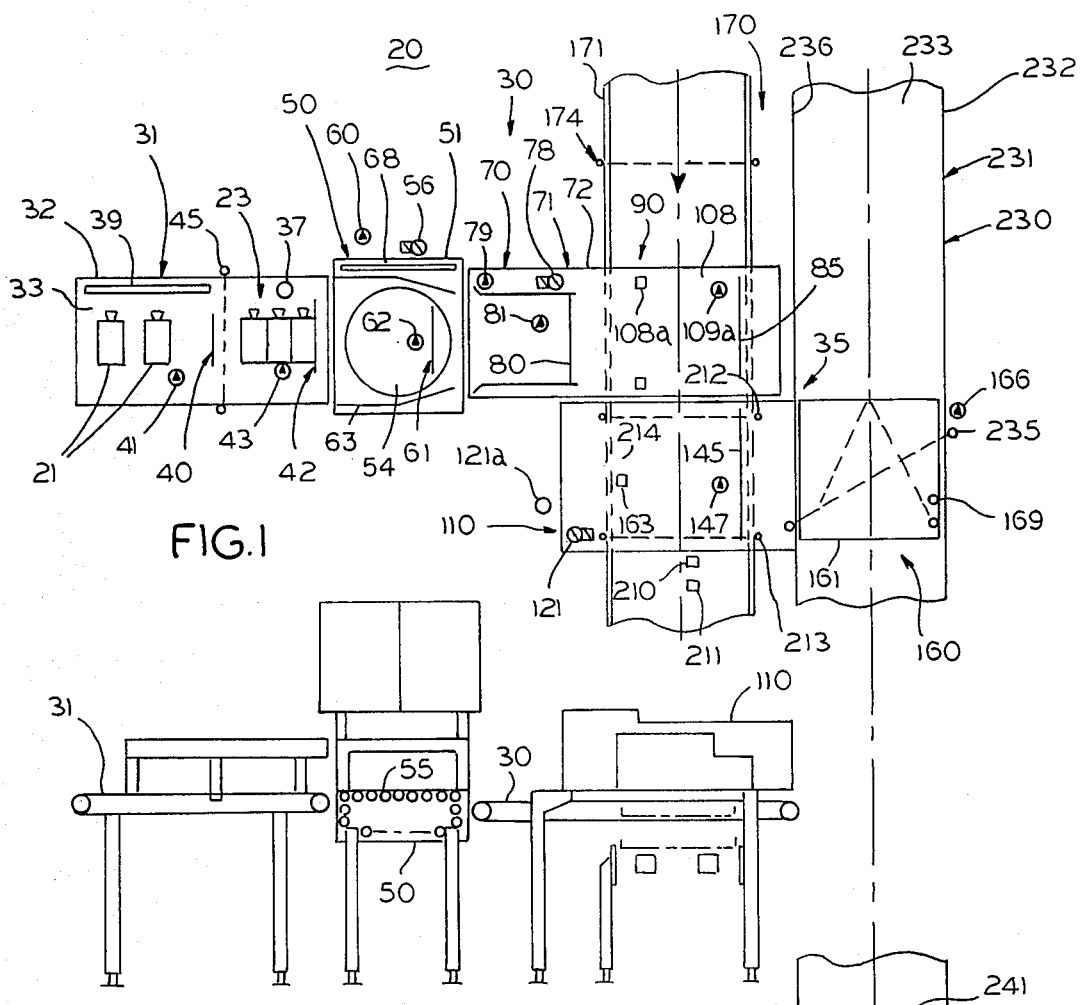
FIG. 1 is a partially diagrammatic, top plan view of a loading system constructed in accordance with and embodying the features of the present invention, shown in conjuncion with an associated stacker.
Figures 2, 3:
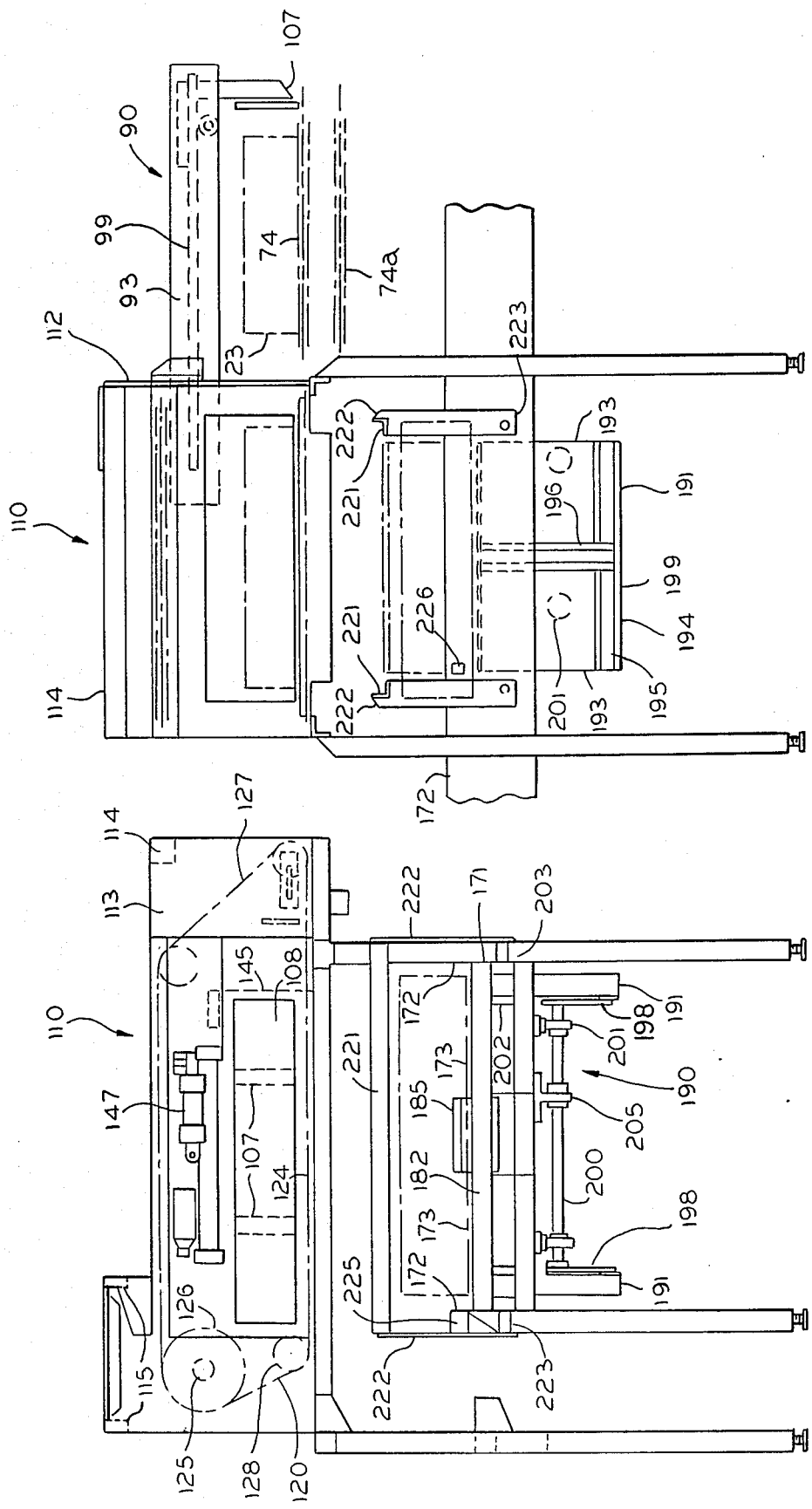
FIG. 2 is an enlarged front elevational view of the container loader assembly of the loading system of FIG. 1.
FIG. 3 is a fragmentary, side elevational view of the loader assembly of FIG. 2, as viewed from the right-hand side thereof.
Figure 4:
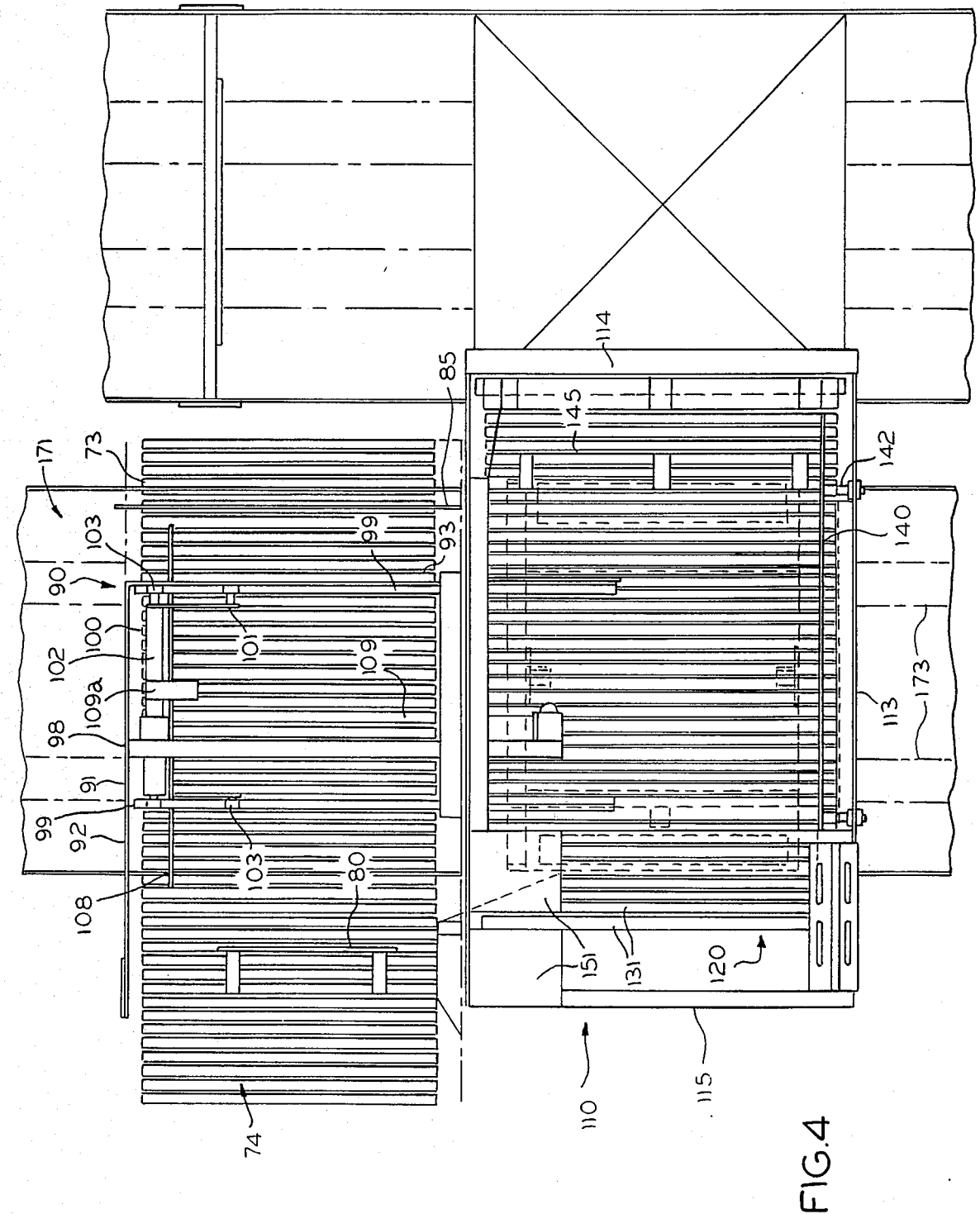
FIG. 4 is a further enlarged, fragmentary, top plan view of the right-hand portion of FIG. 1.

Referring to FIGS. 1 and 2 of the drawings, there is illustrated a loading system, generally designated by the numeral 20, constructed in accordance with and embodying the features of the present invention. The loading system 20 includes a product handling system 30 for handling the product, such as baked goods, to be loaded and a container handling system 170 for handling the containers into which the product is to be loaded. The product handling system 30 and the container handling system 170 interface at a loading station 35, at which station the product, which may comprise articles 21 of baked goods, such as packages of sliced bread, for example, are loaded into the containers, which may be in the form of trays 25 (FIGS. 10A-10D) or baskets 27 (FIGS. 11A-11D).

The product handling system 30 includes an infeed staging conveyor 31, which is preferably an endless free roller conveyor mounted on the frame 32 and defining a substantially horizontal upper support reach 33, which carries spaced-apart product articles 21 to the right, as viewed in FIG. 1. The staging conveyor 31 is driven by a suitable motor 37 (see FIG. 12A), and includes a friction shoe 39 adapted to be selectively engageable with a plurality of rollers along a portion of the conveyor 31 for rotating the rollers backwards and thereby effectively slowing the movement of the product articles for increasing the separation therebetween, all in a well known manner.

The infeed staging conveyor 31 includes a gate 40 which may be in the form of a flat plate movable between a release position, disposed substantially parallel to the support reach 33 and spaced sufficiently thereabove to accommodate the passage of articles thereabeneath, and a stop position, disposed substantially perpendicular to the support reach 33 for stopping the passage of conveyed articles 21. The gate 40 is operated by a suitable air cylinder (not shown) under control of a solenoid valve 41. A similar gate 42, operated by an air cylinder (not shown) under control of a solenoid valve 43, is provided adjacent to the exit end of the infeed staging conveyor 31. Disposed just downstream of the gate 40 is a counter photo eye 45 which operates, in standard fashion, to count the number of conveyed articles passing the gate 40.

In the preferred embodiment of the invention, the conveyed articles 21 are loaded in predetermined groups or patterns of a plurality of articles into the associated containers. Typically, the articles 21 are spaced apart and fed serially into the infeed staging conveyor 31, where they are grouped into subgroups 23 (each of which may contain 1, 2 or 3 articles, depending on the program) which are then oriented in predetermined orientations for arrangement into the desired pattern 24 (FIGS. 10A-10D). For this purpose, there is provided an orienter 50, which may be of the type disclosed in the aforementioned U.S. Pat. No. 4,522,292, wherefore only so much of the orienter 50 as is necessary for an understanding of the present invention will be disclosed herein.

THe orienter 50 includes a frame 51 carrying a rotatably mounted circular turntable 54 having an upper surface which is disposed substantially coplanar with the support surface of the infeed staging conveyor 31. The orienter 50 also includes an endless window roller conveyor 55 of the type disclosed in the aforementioned U.S. Pat. No. 4,522,292, and including a conveyor section comprising a plurality of freely-rotating rollers and a window section which comprises a gap wherein no rollers are provided. The window conveyor 55 defines an upper, substantially horizontal reach, which passes just above the upper surface of the turntable 54 parallel thereto and very closely adjacent thereto.

Figure 1A:
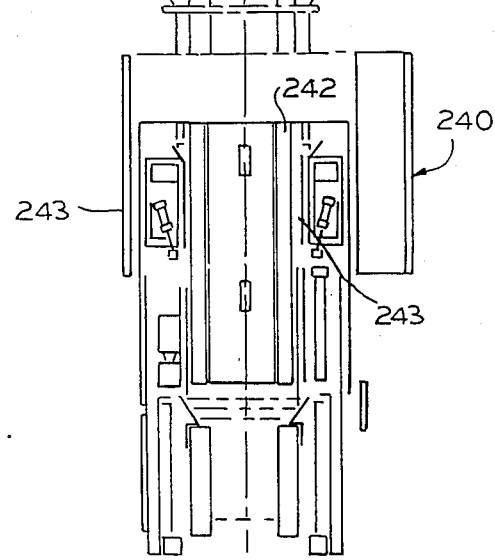
FIG. 1A is a partially diagrammatic side elevational view of the loading system of FIG. 1.

The window conveyor 55 is driven by a suitable motor 56 (see FIG. 12A) in a clockwise direction, as viewed in FIG. 1A, the conveyor 55 being so arranged that the upper support reach thereof is substantially coplanar with the support reach 33 of the infeed staging conveyor 31, and being so positioned as to receive subgroups of articles exiting the infeed staging conveyor 31. The turntable 54 may be rotated in either direction by a suitable stepping motor 59 (see FIG. 12A), coupled to the turntable 54 through a suitable clutch/brake assembly controlled by a solenoid valve 60 (see FIG.

12A). An exit gate 61, which is substantially similar to the gates 40 and 42, is disposed adjacent to the exit end of the orienter 50, being operated by a suitable air cylinder (not shown) under the control of a solenoid valve 62. Guides 63 may be provided to guide conveyed articles from the infeed staging conveyor 31 onto the turntable 54. The window conveyor 55 engages a plurality of limit switches LS-1, LS-2, LS-3 and LS-4 to facilitate control of the operation thereof, as will be explained more fully below.

In operaton, the gate 42 is normally closed. When a predetermined number of conveyed articles have been counted by the photo eye 45, the gate 40 is closed. The counted articles are stopped against the gate 42 to form a subgroup 23. The gate 42 is then opened to pass the subgroup 23 to the orienter 50. When the gate 42 is opened, the subgroup 23 of articles 21 is conveyed onto the conveyor section of the window conveyor 55, the subgroup 23 being stopped against the gate 61 as the window conveyor 55 passes therebeneath, until the subgroup 23 falls through the window section of the window conveyor 55 onto the turntable 54. A deceleration shoe 68 may be provided for contact with the rollers of the window conveyor 55 to limit the impact of the subgroup 23 against the gate 61. The window conveyor 55 then stops, the gate 61 opens and, depending upon the predetermined pattern 24 of articles to be loaded into a container, the turntable 54 may or may not be rotated to reorient the subgroup 23 of articles 21 thereon. In this regard, the turntable 54 may be rotated in either direction through any desired angle but, typically, it will be rotated through 90° or 180°. After rotation of the turntable 54, the window conveyor 55 resumes operation, the lead roller on the window section thereof pushing the reoriented subgroup 23 of articles off the orienter 50 through the open gate 61 as the next subgroup 23 is conveyed onto the orienter 50.

Figure 12A:
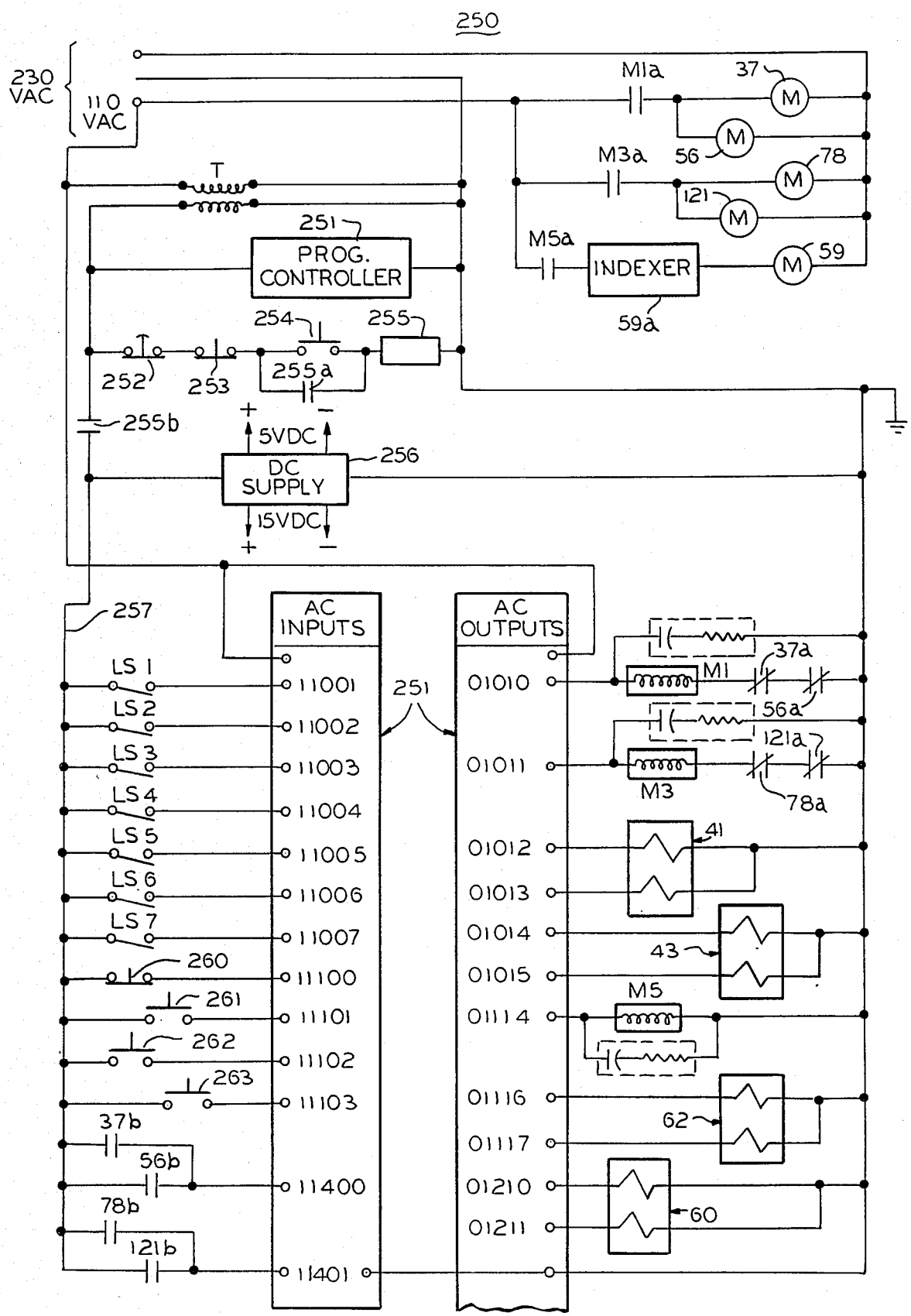
FIGS. 12A and 12B are a schematic circuit diagram of the product handling system of the loading system of FIG. 1.
Figure 12B:
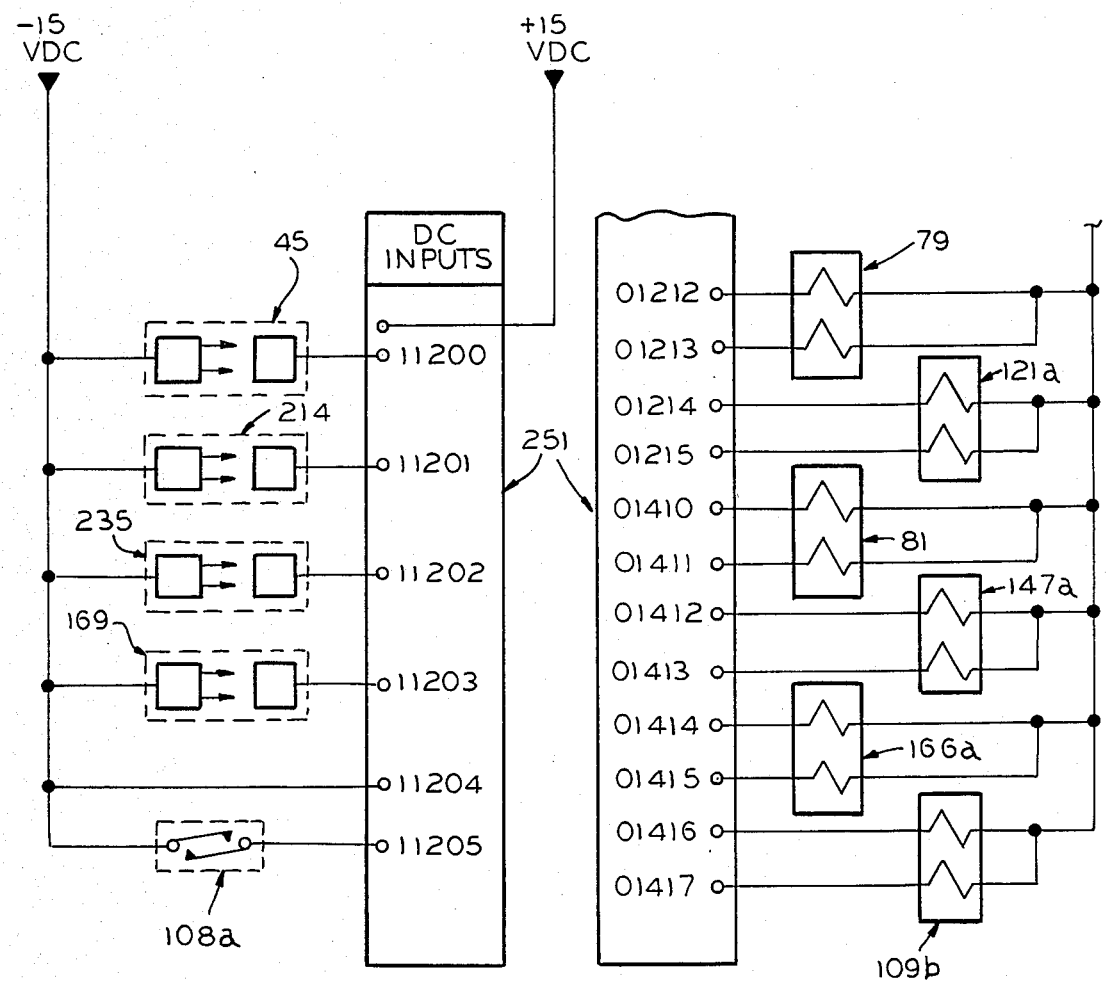

As the subgroup 23 of articles 21 exits the orienter 50, it is fed onto a loader input assembly 70, which includes an endless roller conveyor 71. Referring in particular to FIGS. 2-5, the roller conveyor 71 is mounted on a frame 72 (FIG. 5) and includes a plurality of free rollers 73 arranged in an endless belt defining a substantially horizontal upper support flight 74 and a return flight 74a (FIG. 3). The roller conveyor 71 is engaged in a known manner with suitable sprockets carried by a plurality of shafts, including a drive shaft (not shown), which is driven by a suitable drive belt or chain (not shown) from a drive motor 78 (see FIG. 12A) through a clutch/brake assembly (not shown) under the control of a clutch/brake solenoid valve 79 (FIGS. 1 and 12B). The drive motor 78 may be mounted on a suitable bracket (not shown) carried by the frame 72 above the roller conveyor 71. The loader input assembly 70 includes an input gate 80, which is similar to the gates 40, 42 and 61 and is operated by a suitable air cylinder (not shown) under the control of a solenoid valve 81 between release and stop positions. A vertical stop plate 85 is disposed adjacent to the right-hand end of the roller conveyor 71, as viewed in FIGS. 1 and 4.

The loader input assembly 70 also includes a pusher assembly 90, which includes a frame 91 supported on the frame 72 above the roller conveyor 71. The frame 91 is substantially rectangular, including an end rail 92, a pair of spaced-apart parallel side rails 93 and a cross bar 94, all supported on the frame 72 by suitable posts 95 (one shown). The forward one of the side rails 93 carries a mounting tab 96 for anchoring the air cylinder which drives the gate 80. Carried by the frame 91 and extending between the side rails 93 and parallel thereto is an enlongated angle iron 98. Fixedly secured to the inner surfaces of the side rails 93 are two elongated racks 99.

The pusher assembly 90 includes a movable carriage 100 having a pair of parallel side plates 101 connected by a cross bar 102, each of the side plates 101 being provided with a pair of rollers 103, respectively rotatably mounted on stub shafts extending laterally outwardy from the side plates 101 for rolling engagement with the upper surfaces of the racks 99. Also interconnecting the side plates 101 is a shaft 104 rotatably mounted in bearings 105 and having respectively fixedly secured to the opposite ends thereof two pinions 106, disposed along the outer surfaces of the side plates 101 for meshing engagement with the racks 99. Carried on the angle iron 98 is a cable cylinder 109, the cable of which is connected by a bracket 109a to the carriage 100 for effecting reciprocating movement thereof and of the pusher bar 108 between a retracted position, illustrated in solid line in FIG. 5 and an extended position illustrated in broken line in FIG. 5.

In operation, a reoriented subgroup 23 exits the orienter 50, it is conveyed along the roller conveyor 71 and stopped by the closed gate 80. When the gate 80 is opened, the subgroup 23 is conveyed along the roller conveyor 71 until it is stopped against the stop plate 85. THe roller conveyor 71 is then stopped and the cable cylinder 109 is actuated under control of a solenoid valve 109b (FIG. 12B) to move the carriage 100 from its retracted position to its extended position and back again. During the movement from the retracted position to the extended position, the pusher bar 108 pushes the subgroup 23 of articles 21 from the roller conveyor 71 into the loader assembly 110. In its retracted position, the pusher bar 108 actuates a reed switch 108a (FIG. 12A).

The loader assembly 110 includes a generally rectangular frame 111 having spaced-apart vertical inner and outer plates 112 and 113 interconnected by an end rail 114 and a pair of support rails 115, all being mounted on suitable posts or legs 117. The loader assembly 110 includes a window conveyor 120 mounted in the frame 111 and being driven around an endless vertical loop in a counterclockwise direction, as viewed in FIG. 2, by a suitable drive motor (see FIG. 12A) operating through a clutch/brake assembly (not shown) under the control of a clutch/brake solenoid valve 121a (FIGS. 1 and 12B) mounted on the top of the frame 111. The drive motor 121 is mounted on the frame 111 and is coupled by a suitable drive chain and sprockets (not shown) to a drive shaft 125, having sprockets 126 engageable with the the endless chains 127 of the window conveyor 120. The chains 127 also engage with sprockets 128 on idler shafts 129 to define an endless vertical loop having a substantially horizontal lower support reach 124.

The window conveyor 120 has a conveyor section 130 comprising a plurality of free rollers 131 supported between the chains 127, and a window section 132 devoid of rollers (see FIGS. 10A–10D). Carried by the chains 127 at the leading end of the conveyor section 130 is a pusher bar 135 which depends from the conveyor section 130 when it is disposed along the support reach 124 of the window conveyor 120, as is best illustrated in FIGS. 10A, C, and D. In FIGS. 11A-D, there is illustrated an alternative embodiment of the window conveyor 120 wherein there is also provided an elongated flexible slide flap 137 carried between the chains 127 at the trailing end of the conveyor section 130 for a purpose to be explained more fully below.

The inner plate 112 of the frame 111 has a large opening therein to accommodate passage of the pusher bar 108 therethrough. The outer plate 113 is provided with a similar opening which is closed by a stop plate 140 carried by support bars 141 and having adjustment screws 142 for adjusting the position of the stop plate 140. The loader assembly 110 also includes an exit gate 145, which is similar to the gate 80, and is mounted on a pivot shaft 146 which extends between the inner and outer plates 112 and 113 for pivotal movement between a substantially vertically disposed stop position, illustrated in FIGS. 2, 5 and 10A, and a release position, illustrated in FIG. 10C, by an air cylinder 147 which is mounted on a suitable bracket 148 (FIG. 5), under the control of a solenoid valve 147a (FIG. 12B).

Figure 5:
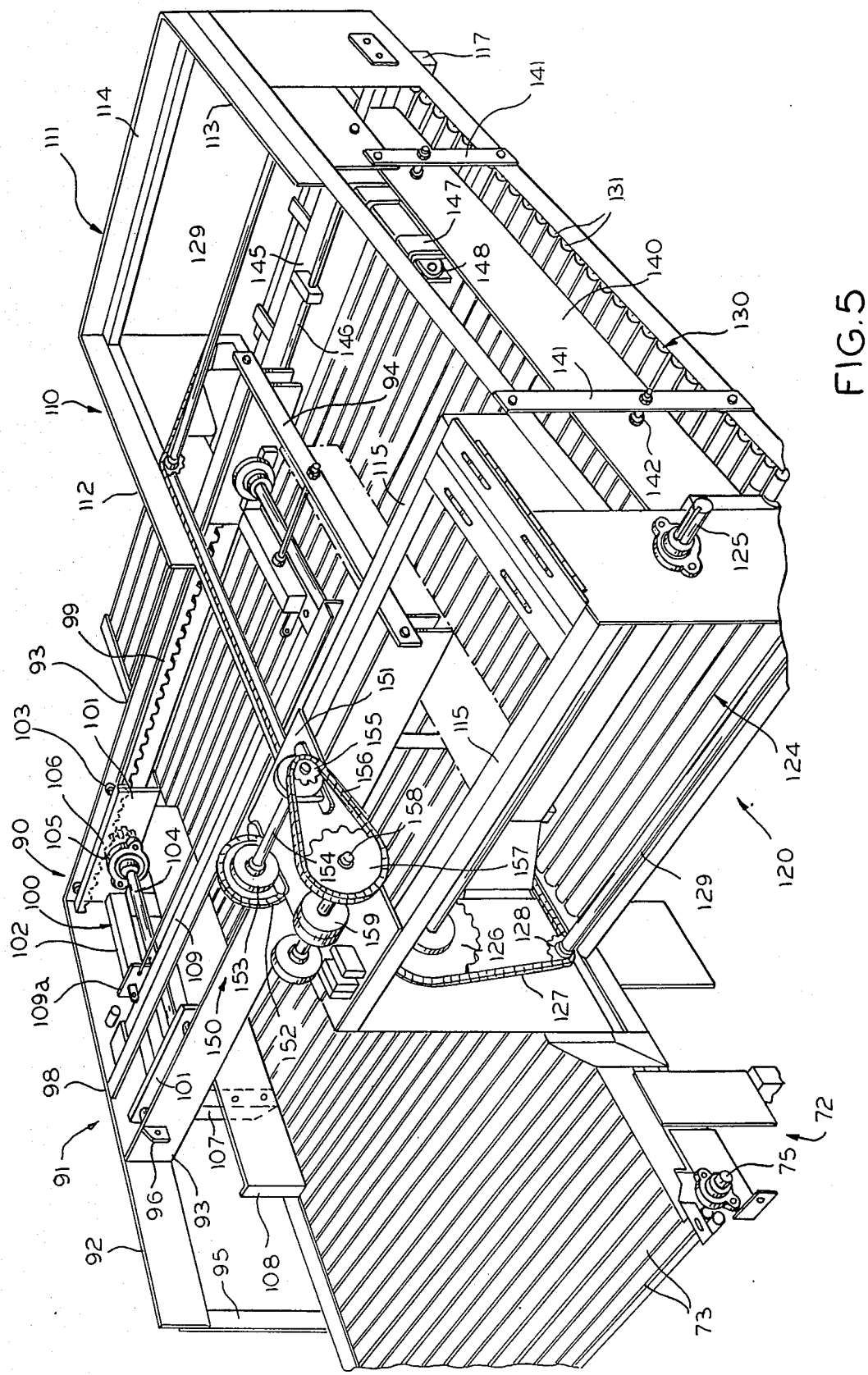
FIG. 5 is a further enlarged, fragmentary, perspective view of the upper portion of the apparatus illustrated in FIG. 4.

The loader assembly 110 also includes a control cam assembly 150, mounted on a pair of support plates 151 carried by the frame 111 (see FIG. 5). The control cam assembly 150 includes a drive chain 152 engaged with a sprocket (not shown) on the drive shaft 125 of the window conveyor 120, outboard of the inner plate 112, and also engaged with a sprocket 153 of a shaft 154 supported in suitable bearings on one of the plates 151. The shaft 154 also carried a sprocket 155 engaged with a chain 156, which is also engaged with a sprocket 157 on a cam shaft 158 carried by suitable bearings on the other one of the plates 151. The cam shaft 158 carries a plurality of cams 159 engageable with the limit switches LS-5, LS-6 and LS-7 (FIG. 12A) for controlling the operation of the loader assembly 110, as will be explained in greater detail below.

Figure 9:
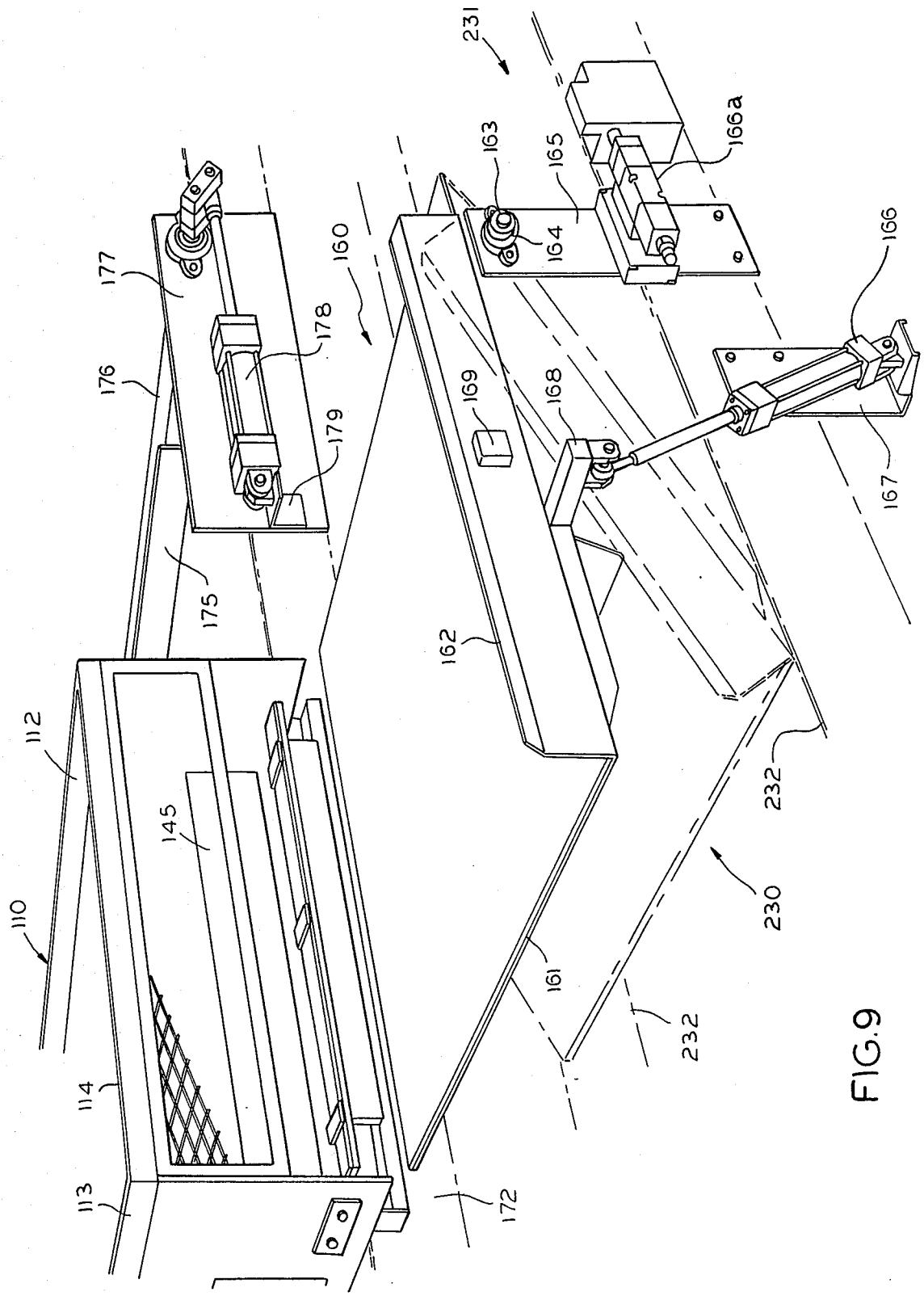
FIG. 9 is an enlarged, fragmentary, perspective view of the discharge slide assembly of FIG. 4.

Referring to FIG. 9, the product handling system 30 also includes a discharge slide assembly 160, which includes a flat rectangular slide plate 161 provided along its outer side edge with an upstanding stop wall 162. Fixedly secured to the slide plate 161 at the rear end thereof is a pivot shaft 163, rotatably mounted in bearings 164 carried respectively by brackets 165, supported as will be explained below. An air cylinder 166 is carried by a mounting bracket 167, the piston rod of the air cylinder 166 being coupled by means of a coupling bracket 168 to the slide plate 161 adjacent to the forward end thereof. The air cylinder 166 operates under control of a solenoid valve 166a (FIG. 12B). Carried by the stop wall 162 is photo eye 169. In use, the slide plate 161 is pivotally movable between a raised discharge position, illustrated in solid line in FIG. 9, and a downwardly inclined outfeed position, illustrated in broken line in FIG. 9.

In operation, a pattern 24 of articles 21 are to be loaded as a group into a container. The pattern 24 may comprise a plurality of the subgroups 23. As the subgroups 23 are fed to the loader input assembly 70, they are sequentially pushed onto the conveyor section 130 of the window conveyor 120 by the pusher bar 108 until the pattern 24 is completed on the window section 130. In this regard, it will be noted that during this operation of loading the subgroups 23 into the loader assembly 110, the conveyor section 130 of the window conveyor 120 is disposed along the lower support reach 124 thereof substantially coplanar with the support flight 74 of the roller conveyor 71 and closely adjacent thereto so that the subgroups 23 of articles can be freely slid from the roller conveyor 71 onto the window conveyor 120. The stop plate 140 will prevent any articles 21 of the pattern 24 from being pushed off the window conveyor 120. When a complete pattern 24 has been assembled on the window conveyor 120, the loader assembly 110 is operated to load the pattern 24 into a container, as will be explained below.

Figure 13A:
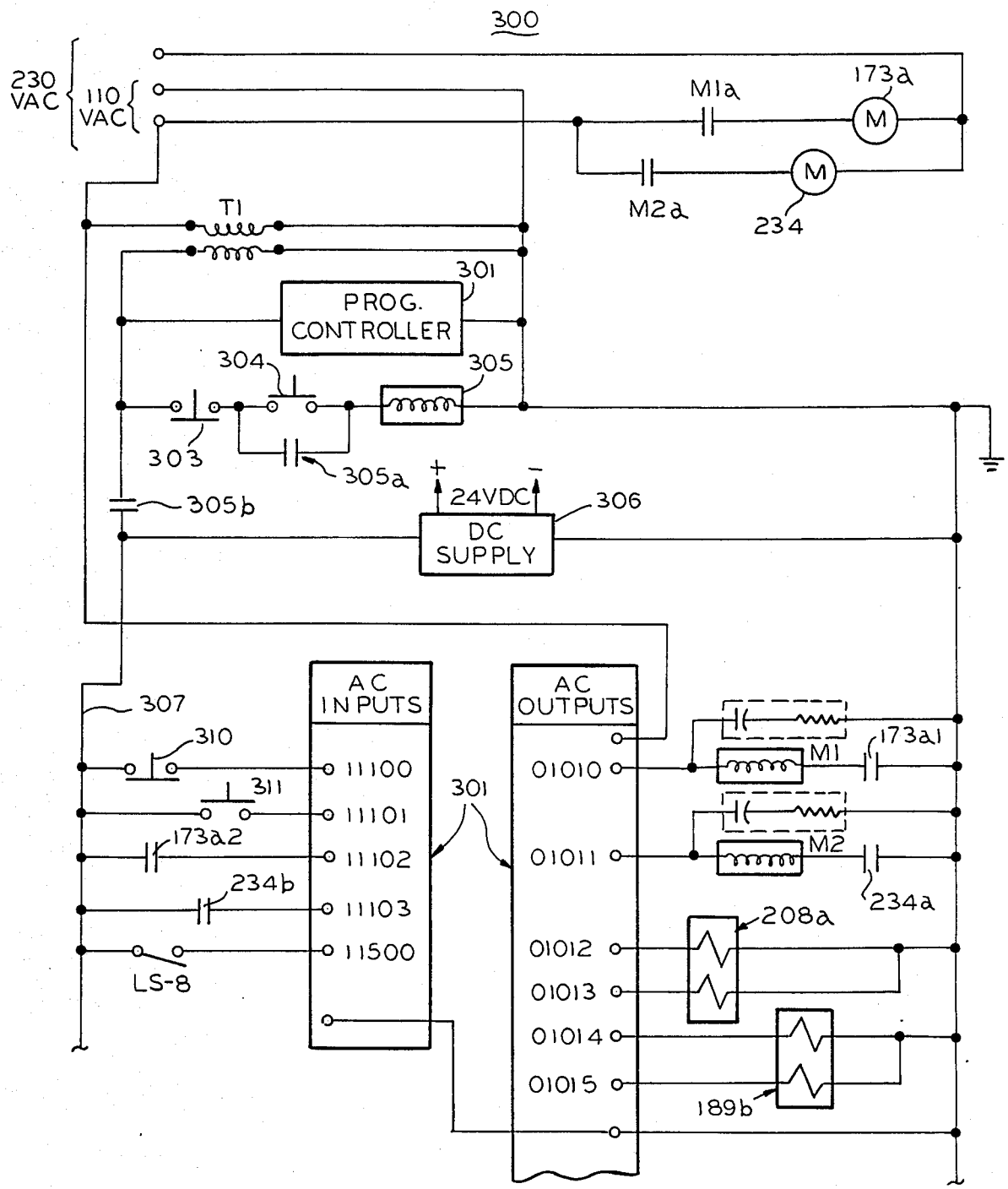
FIGS. 13A and 13B are a schematic circuit diagram of the control circuit for the container handling system of the loading system of FIG. 1.
Figure 13B:
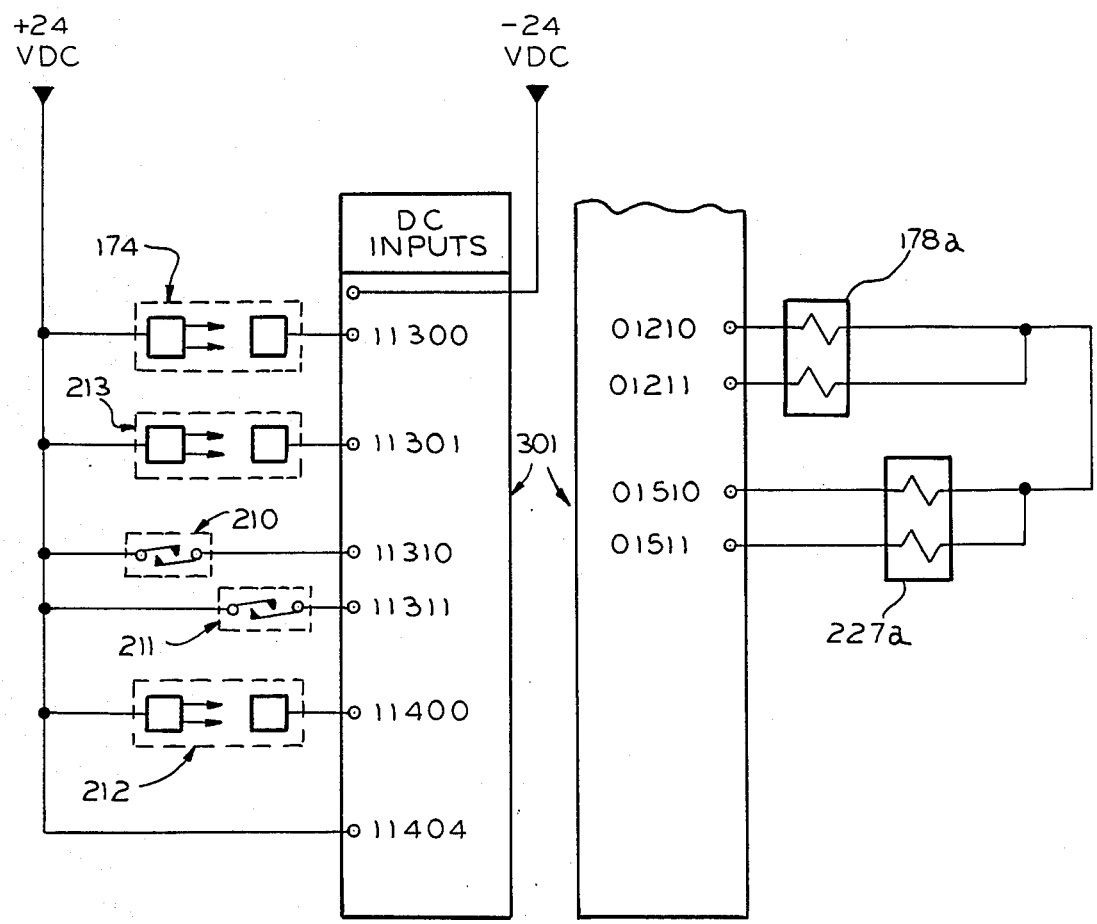

Referring now to FIGS. 6–8 of the drawings, the container handling system 170 will be described. For purposes of this description, it will be assumed that the containers comprises trays 25 (see FIG. 10), although it will be appreciated that the containers could also be baskets 27 (FIGS. 11A-D). The container handling system 170 includes an elongated infeed conveyor 171 which extends beneath the loader input assembly 70 and the loader assembly 110 for movement in the direction of the arrows in FIG. 1, substantially perpendicular to the direction of movement of articles 21 along the roller conveyor 71. The infeed conveyor 171 includes a pair of elongated side rails 172 and a suitable continuous belt 173, which may be of any desired type, and is driven by a suitable motor 173a (FIG. 13A). A photo eye 174 spans the infeed conveyor 171 upstream of the product handling system 30 to produce a beam which is intercepted by trays 25 as they move along the conveyor 171. Also provided is an indexer gate 175 (see FIG. 9) which is similar to the gates 80 and 145 and is mounted on a pivot shaft 176 extending between brackets 177 carried by the side rails 172. The pivot shaft 176 is rotatably mounted in suitable bearings for rotation by an air cylinder 178 carried on a mounting bracket 179 for moving the gate 175 between a substantially vertical stop position for stopping the movement of trays 25 along the infeed conveyor 171 and a release position for allowing passage of trays 25, under control of a solenoid valve 178a (FIG. 13B).

The container handling system 170 also includes a lifter assembly 180 which spans the infeed conveyor 171 immediately beneath the loader assembly 110. The lifter assembly 180 has a frame 181 which includes a pair of transverse bars 182 extending between the side rails 172 and interconnected by a pair of longitudinal bars 183. The frame 181 is disposed beneath the level of the container infeed conveyor 171. A stop gate 185 is mounted on the frame 181 for pivotal movmeent about the axis of a pivot shaft 186 which is pivotally carried on a pair of upstanding brackets 187 mounted on the forward one of the transverse bars 182. The stop gate 185 is moved by means of air cylinder 189a, under control of a solenoid valve 189b (FIG. 13A), between an upright stop position, illustrated in FIG. 6, for blocking the movement of trays 25 along the infeed conveyor 171 and a lowered release condition, illustrated in broken line in FIG. 7, for permitting the passage of trays 25.

The lifter assembly 180 also includes a lift carriage 190 having a pair of rectangular side frames 191, each having a horizontal support plate 192 at the upper end thereof, and interconnected by vertical posts 193 with a bottom guide rail 194 having elongated guide slots 195 therein. Also interconnecting the bottom guide rail 194 with the support 192 on each of the side frames 191 is a vertical guide rail 196 having an elongated guide slot 197 therein. The lifter assembly 180 also includes two pairs of guide brackets 198, each bracket 198 carrying a guide lug 199 disposed for engagement in a corresponding one of the horizontal guide slots 195. Each pair of guide brackets 198 is interconnected by an elongated pivot shaft 200 rotatably journalled in suitable bearings 201 depending from the longitudinal bars 183. Respectively carried by the longitudinal bars 183 are upstanding arms 202, each carrying a laterally outwardly extending guide shaft 203 disposed in a corresponding one of the vertical guide slots 197. Fixed on each of the pivot shafts 200 is a pinion 205 disposed in meshing engagement with an elongated rack 206 which rests thereon, the rack 206 being guide in two slotted guide plates 207, respectively carried beneath the transverse bars 182. The rack 206 is coupled to the extensible piston rod of an air cylinder 208, which is anchored on a bracket 209 carried by one of the transverse bars 182, for operation under control of a solenoid valve 208a (FIG. 13A).

In operation, the air cylinder 208 effects a reciprocating movement of the rack 206 in the direction of its longitudinal axis. Normally, the lift carriage 190 is disposed in a lowered position, illustrated in solid line in FIGS. 2 and 6–8, in which position the upper surfaces of the support plates 192 are disposed just below the level of the support reach of the infeed conveyor 171, as is best illustrated in FIGS. 2 and 8. When the piston rod of the air cylinder 208 extends, it moves the rack 206 longitudinally to the right, as viewed in FIGS. 6 and 7, thereby rotating the shafts 200 in a clockwise direction. This pivots the guide brackets 198 upwardly, moving the guide lugs 199 to the left along the guide slots 192 and lifting the lift carriage 190 to a raised position, illustrated in broken lines in FIG. 8. The lift carriage 190 is constrained to a purely vertical movement by engagement of the guide shafts 203 in the vertical guide slots 197. When the piston rod of the air cylinder 208 retracts, the lift carriage 190 is lowered. The lift carriage 190 is positioned to actuate reed switches 210 and 211, respectively, in the raised and lowered positions thereof (see FIG. 1). Also, the lifter assembly 180 is provided with two photo eyes 212 and 213 disposed so as to have the beams thereof interrupted by a tray 25 supported on the lift carriage 190 in its lowered position (FIGS. 1 and 13B), and a photo eye 214 disposed so as to be interrupted by a tray 25 on the lift carriage 190 in its raised position (see FIGS. 1 and 12B).

The container handling system 170 also includes a support assembly 220 adapted to receive and hold a tray 25 in a loading position when a tray 23 is raised to that position by movement of the lift carriage 190 to its raised position. The support assembly 220 includes a pair of parallel, spaced-apart angle irons 221, each integral at its opposite ends with a pair of depending arms 222, the lower ends of which are provided with laterally inwardly extending stub shafts 223 rotatably mounted in bearings 224 carried by the side rails 172 of the infeed conveyor 171. One of the arms 222 for each of the angle irons 221 is provided with a stop tab 225 disposed for engagement with a pair of adjustable stops 226 to limit the pivotal movement of the support assembly 220 about the axes of the stub shafts 223.

Pivotal movement of the support assembly 220 is effected by an air cylinder 227, the cylinder and piston rod of which are respectively coupled by coupling arms 228 and 229 to adjacent depending arms 222 of the support assembly 220. It will be appreciated that by extension and retraction of the piston rod of the air cylinder 227, the support assembly 220 is pivotally moved between a support condition, illustrated a solid line in FIGS. 2, 3, 6 and 7 and a release position illustrated in broken line in FIGS. 6 and 7.

As can best be seen in FIGS. 2 and 3, the angle irons 221 of the support assembly 220 are disposed so as to hold a tray 25 in a loading position disposed immediately beneath the lower support reach 124 of the window conveyor 120. A tray 25 is shown held in this position in FIGS. 10A–C. In use, when a tray is needed by the loader assembly 110, the stop gate 185 is raised to intercept a tray 25 being carried along the infeed conveyor 171 and stop it in a lifting position disposed immediately above the lift carriage 190. When the tray 25 has been stopped in this position, as detected by the photo eyes 212 and 213, the air cylinder 227 is actuated under control of a solenoid valve 227a (FIG. 13B) to move the support assembly 220 to its release position, and the lift carriage 190 is actuated by the solenoid valve 208a to lift the tray 25 to its loading position. When the tray 25 reaches its loading position, as detected by the photo eye 214, the solenoid valve 227a is actuated to move the support assembly 220 back to its normal support position, wherein the angle irons 221 are respectively disposed in supporting engagement with the opposite sides of the tray 25. The lift carriage 190 is then returned to its lowered position and the stop gate 185 is lowered.

It will be appreciated that the infeed conveyor 171 preferably services a number of product handling systems 30 arranged in parallel. Thus, the lowering of the stop gate 185 permits trays 25 to pass through the product handling system 30 to other like systems, while the container is being loaded.

Referring now also to FIGS. 1 and 9 of the drawings, the container handling system 170 also includes an outfeed assembly 230, which includes a tray conveyor 231 arranged substantially parallel to the infeed conveyor 171 and generally coplanar therewith. The conveyor 231 includes a pair of side rails 232 and an endless conveyor belt 233 which may be of any suitable type and may be driven by a suitable motor 234 (FIG. 13A). A photo eye 235 is provided with a beam positioned to be interrupted by a tray 25 on the conveyors 231 adjacent to the loader assembly 110.

When the slide plate 161 is disposed in its discharge position, it is disposed substantially horizontally and substantially coplanar with the supporting surfaces of the angle irons 221 of the support assembly 220, closely adjacent to the exit end of the window conveyor 120.

When a complete pattern 24 of articles has been assembled on the conveyor section 130 of the window conveyor 120, the window conveyor 120 is operated in a counterclockwise direction. Referring to FIGS. 10A–10D, the pattern 24 is held against movement by the exit gate 145. Thus, the rollers 131 of the conveyor 130 roll out from beneath the pattern 24, allowing it to fall through the window section 132 into the tray 25 which is being held in its loading position by the support assembly 220, as indicated in FIG. 10B.

At this point the exit gate 145 is raised to its release position under the control of the limit switches LS-5 - LS-7 and, as the window conveyor 120 continues moving, the pusher bar 135 engages the tray 25 and pushes it off the support assembly 220 onto the slide plate 161 of the discharge slide assembly 160, as indicates in FIG. 10D, at which point the exit gate 145 recloses and the window conveyor 120 stops in its rest position, with its conveyor section 131 disposed along the lower support reach 124 to receive another pattern 24 from the loader input assembly 70.

When the loader tray 25 is moved onto the slide plate 161, as detected by the photo eye 169, the discharge slide assembly 160 waits until the outfeed conveyor 231 is clear, as detected by the photo eye 235, and then lowers the slide plate 161 to its inclined position to allow the loaded tray 25 to slide down onto the outfeed conveyor 231. It will be appreciated that the outfeed conveyor 231 can also be fed from other product handling systems 30.

The loaded trays are then conveyed along the conveyor 231 to downstreamm handling facilities, which may include a bottom-up stacker 240 (see FIG. 1), which may be of known construction. Such a stacker typically receives loaded trays sequentially along an infeed conveyor 241, carrying each tray onto supports 242 disposed immediately beneath a stack of loaded trays which are carried on tilt arms 243. When the loaded tray is in position on the supports 242, the tilt arms 243 and the stack carried thereon are lowered over the new loaded tray. When the tilt arms 243 engage the top of the new tray, they tilt upwardly to allow passage alongside the tray, thereby depositing the stack on top of the new tray. When the tilt arms 243 clear the bottom of the new tray they fall back to their support position, after which they are raised to again lift the stack, which has now been increased by the addition to the bottom thereof of the new loaded tray. When a stack is completed it is fed by suitable conveying means from the bottom-up stacker 240.

Referring now to FIGS. 12A and B, the control circuit 250 for the product handling system 30 will be described. The motors 37 and 56, which respectively drive the product infeed staging conveyor 31 and the orienter window conveyor 55, the orienter turntable stepping motor 59, the motor 78 for the roller conveyor 71 of the loader input assembly 70 and the drive motor 121 for the window conveyor 120 of the loader assembly 110, are preferably all driven from a suitable 230 VAC supply. The remainder of the control circuit 250 is powered from a 110 VAC supply. The control circuit 250 includes a programmable controller 251 operating under stored program control. The programmable controller 251 may be any of a number of different types of commercially available controllers, such as that sold by Allen-Bradley Co. under the designation PLC 2/15. In FIGS. 12A and B, the programmable controller 251 has been illustrated in two sets of blocks, the left-hand one having AC and DC input terminals and the right-hand one having AC output terminals. Associated with each such terminal is a five-digit number designating the software address of the function associated with that terminal. The same five-digit numbers are used in the program software, set forth in the Microfiche Appendix. Input function addresses begin with the numeral "1", while output function addresses begin with the numeral "0".

Connected across the 110 VAC supply is the primary of a constant voltage input control transformer T, the secondary of which has a common ground with the primary. Across the secondary of the transformer T is connected the programmable controller 251. Connected in parallel with the programmable controller 251 is the series connection of a normally-closed pushbutton emergency stop switch 252, a normally-closed pushbutton power down switch 253, a normally-open pushbutton power up switch 254 and the coil of a control relay 255. The control relay 255 has normally-open contacts 255a connected in parallel with the power up switch 254 for latching the relay 255 energized. Also connected in parallel with the programmable controller 251 is the series combination of normally-open contacts 255b of the control relay 255 and a DC power supply 256. The power supply 256 provides 5 VDC and 15 VDC supply voltages. The 15 VDC supply is applied to the programmable controller 251, as indicated in FIG. 12B. The 5 VDC supply may be used to power other functions in the programmable controller 251 which are set forth in the program as listed in the Microfiche Appendix, but which have, for simplicity, been omitted from the control circuitry as illustrated in FIGS. 12A and 12B. The 110 VAC supply is also applied to the programmable controller 251, as indicated in 12A.

The programmable controller 251 is connected in circuit with a number of control elements. Connected in series between an AC output of the programmable controller 251 and the ground line of the AC supply is the series connections of the coil of a control delay MI and the normally-closed overload contacts 37a and 56a of the motors 37 and 56. The relay MI has normally open contacts M1a which are connected in series with the motors 37 and 56. Also connected in series between an AC output terminal of the programmable controller 251 and ground is the series connection of the coil of a relay M3 and the normally-closed overload contacts 78a and 121a of the motors 78 and 121. The relay M3 has normally-open contacts M3a connected in series with the motors 78 and 121. Also connected in series between an AC output terminal of the programmable controller 251 and ground is the coil of a control relay M5 which has normally-open contacts M5a connected in series with the motor 59 and the indexer 59a thereof.

The motors 37 and 56 have normally-open overload contacts 37b and 56b which are connected in parallel between a line 257 connected to the hot input terminal of DC supply 256 and an AC input terminal of the programmable controller 251. The motors 78 and 121 have normally-open overload contacts 78b and 121b connected in parallel between the line 257 and an AC input terminal of the programmable controler 251. Also connected between the line 257 and respective AC input terminals of the programmable controller 251 are a normally-closed orienter and loader assembly stop switch 260, a normally-open loader assembly start switch 261, a normallyopen orienter start switch 262 and a normally-open pattern select switch 263.

Connected between ground and AC output terminals of the programmable controller 251 are the solenoid valves 41, 43, 62, 60, 79, 121a, 81, 147a, 166a and 109b. Also connected between AC input terminals of the programmable controller 251 and the line 257 are the limit switches LS-1 through LS-7. Connected between DC input terminals of the programmable controller 251 and the −15 VDC supply terminal are the reed switch 108a and the photo eyes 45, 214, 235 and 169 (FIG. 12B).

Referring now to FIGS. 13A and B, there is illustrated the control circuit 300 for the container handling system 170. The control circuit 300 is similar to the control circuit 250 set forth in FIGS. 12A and B and similar conventions apply.

The motors 173a and 234, which respectively drive the container infeed conveyor 171 and the container outfeed conveyor 231, are preferably driven from a suitable 230 VAC supply. The remainder of the control circuit 300 operates from a suitable 120 VAC supply. The control circuit includes a programmable controller 301, which may be of the same type as the controller 251, described in connection with FIGS. 12A and B.

Connected across the 110 VAC supply is the primary of a constant voltage input control transformer T1, the secondary of which has a common ground with the primary. Connected across the secondary is the programmable controller 301. Also connected across the secondary is the series connection of a normally-closed pushbutton power down switch 303, a normally-open pushbutton power up switch 304 and the coil of a control relay 305. The control relay 305 has normally-open contacts 305a connected in parallel with the power up switch 304 to latch the relay 305 energized. Also connected across the secondary of the transformer T1 is the series connection of normally-open contacts 305b of the relay 305 and a DC power supply 306 which products a 24 VDC supply voltage. The 110 VAC supply is connected to the programmable controller 301 as indicated in FIG. 13A and the 234 VDC supply is connected to the programmable controller 301 as indicated in FIG. 13B.

Connected between an AC output terminal of the programmable controller 301 and ground is the series connection of the coil of a control relay M1 and the normally-closed overload contacts 123a1 of the motor 173a. The relay M1 has normally-open contacts M1a connected in series with the motor 173a. Connected in series between another AC output terminal of the programmable controller 301 and ground is the series connection of the coil of a control relay M2 and the normally-closed overload contacts 234a of the motor 234. The relay M2 has normally-open contacts M2a connected in series with the motor 234. The motors 173a and 234 also respectively have normally-open overload contacts 173a2 and 234b connected between a line 307 (connected to the hot input terminal of the DC supply 306) and AC input terminals of the programmable controller 301.

Also connected between the line 307 and respective AC input terminals of the programmable controller 301 are a normally-closed pushbutton conveyor stop switch 310 and a normally-open pushbutton conveyor start switch 311. The limit switch LS-8 is connected between the line 307 and an AC input terminal of the programmable controller 301. Connected between AC output terminals of the programmable controller 301 and ground are the solenoid valves 208a, 189b, 178a and 227a. Connected between the +24 VDC supply terminal and respective DC input terminals of the programmable controller 301 are the photo eyes 174, 213 and 212 and the reed switches 210 and 211.

It is believed that the operation of the control circuits 250 and 300 in conjunction with the associated program software set forth in the Microfiche Appendix will be readily understood by those skilled in the art. However, there follows a simplified explanation of the overall operation of the loading system 20, with reference to the control circuits 250 and 300. After the system is powered up by operation of the switches 254 (FIG. 12A) and 304 (FIG. 13A), a pattern will be selected by operation of the switch 263. For simplicity, only one pattern selection switch has been shown. Closure of that switch inputs a signal to the programmable controller 251 at address 11003, which then operates to control the operation of the system 20 in accordance with a predetermined pattern. It will be appreciated that when multiple patterns are to be formed, a selector switch will be provided for each such pattern. Then, the operator turns on the loader input assembly conveyor 71 and the loader assembly window conveyor 120 by depressing the push button start switch 261, inputting a signal to the programmable controller 251 at address 11101. The controller 251 responds by producing an output signal at address 01011, energizing the control relay M3 to actuate the drive motors 78 and 121. The operator then turns on the infeed staging conveyor 31 and the orienter window conveyor 55 by depressing the start switch 262, inputting a signal to the programmable controller 251 at address 11102. The controller 251 responds by producing an output signal at address 01010 to energize the control relay M1, actuating the drive motors 37 and 56.

The infeed staging conveyors 31 starts immediately and runs continuously, but the conveyors 55, 71 and 120 do not start because their clutches are normally disengaged. Articles 21 are counted through the gate 40 by the photo eye 45. The count is input to the programmable controller 251 at address 11200 (FIG. 12B). When the proper count for the next pattern subgroup is counted, the programmable controller produces an output signal at address 01012 to actuate the solenoid valve 41 (FIG. 12A) to close the gate 40. Simultaneously, a signal is produced at address 01015 to actuate the solenoid valve 43 to open the gate 42, if certain conditions exist. These conditions are that: (1) the orienter window conveyor 55 is in its home position, as detected by closure of limit switch LS-1, to produce an input signal at address 11001; (2) the turntable 54 is stopped, as detected by the absence of an output signal at address 01114; and (3) gate 80 is open to allow articles to pass through the pusher assembly 90, as detected by the presence of a signal at address 01411.

Also simultaneously with the opening of gate 42, an output signal is produced at address 01210 to energize the clutch portion of the solenoid valve 60 to engage the clutch of the motor 56 and start the orienter window conveyor 55. The window conveyor 55 starts from its home position, wherein the window section thereof overlies the turntable 54. Thus, as the window conveyor 55 starts, the lead roller of its conveyor section begins to move up and over the support plate 53 and the turntable 54, pushing therefrom the previously oriented subgroup through the open gate 61, and at the same time coming into position to receive the next subgroup from the infeed staging conveyor 31 through the open gate 42. Simultaneously with the starting of the window conveyor 55, an output signal is produced at address 01212 to energize the clutch portion of the solenoid valve 79 to engage the clutch of the motor 78 and start the loader infeed conveyor 71 to receive the previously-oriented subgroup exiting the orienter 50.

When the window conveyor 55 reaches a predetermined position sufficient for the previous subgroup to have cleared the orienter 50, the limit switch LS-3 is closed, inputting a signal to the programmable controller 251 at address 11003. The programmable controller 251 responds by outputting a signal at address 01116 to actuate the solenoid valve 62 to close the gate 61. Thus, the new subgroup entering the turntable 54 will be stopped against the closed gate 61. The window conveyor 55 continues to move beneath the stopped subgroup and, when it reaches a further predetermined position, the limit switch LS-2 is closed, inputting a signal to the programmable controller 251 at address 11002. The programmable controller 251 responds to produce an output signal at address 01014 to actuate the solenoid valve 43 to close the gate 52 to accumulate the next subgroup.

As the window conveyor 55 continues moving, the window section thereof moves beneath the subgroup 23 stopped against the gate 61, so that subgroup 23 drops through the window section onto the turntable 54. As the window conveyor 55 continues moving to a third predetermined position, the limit switch LS-4 is closed, inputting a signal to the programmable controller 251 at address 11004. The programmable controller 251 responds by producing an output signal at address 01117 to actuate the solenoid valve 62 to open the gate 61. Simultaneously, an output signal is produced at address 01114 to energize the control relay M5 and actuate the stepping motor 59 for rotating the turntable 54 through a predetermmined angle in a predetermined direction, depending upon the pattern to be formed. The window conveyor 55 continues moving until it returns to its home position, at which point the limit switch LS-1 is closed, inputting a signal to the programmable controller 251 at address 11001. The controller 251 responds by producing an output signal at address 01211 to energize the brake portion of the solenoid valve 60 to engage the brake of the motor 56 and stop the window conveyor 55.

The loader input assembly conveyor 71 will carry the subgroup 23 received from the orienter 50 until it is stopped against the stop plate 85 in front of the pusher bar 108. Depending upon the type of pattern to be formed, the conveyor 71 will stop either in response to closure of the limit switch LS-3 or upon timing out of an internal timer started by closure of the limit switch LS-2. In either event, the programmable controller 251 outputs a signal at address 01213 to energize the brake portion of the solenoid valve 79, engaging the brake of the motor 78 to stop the conveyor 71.

Normally, the pusher bar 108 is disposed in a home or retracted position, illustrated in solid line in FIG. 5, in which position it closes the reed switch 108a to input a signal to the programmable controller 251 at address 11205. Normally, the window conveyor 120 of the loader assembly 110 is disposed in a home position with the conveyor section 130 thereof disposed along the lower support reach 124 thereof, in which position the limit switch LS-5 is closed to input a signal to the programmable controller 251 at address 11005. If both the pusher bar 108 and the window conveyor 120 are in their home positions, when the loader input assembly conveyor 71 stops the programmable controller 251 will produce an output signal at address 01416 to actuate the solenoid valve 109b to extend the carriage 100 of the pusher assembly 90, and thereby the pusher bar 108, to push the subgroup 23 stopped against the stop plate 85 onto the conveyor section 130 of the window conveyor 120. If this is not the last subgroup in a multi-subgroup pattern, the pusher bar 108 will retract when an internal timer in the programmable controller 251 times out. In particular, an output signal will be produced at address 01417 of the controller 251 to energize the solenoid valve 109b to retracvt the pusher assembly 90.

When the next subgroup is pushed onto the window conveyor 120 it engages the previous subgroup and pushes it further onto the window conveyor 120, the stop plate 140 preventing articles from being pushed off the window conveyor 120. If the orienter window conveyor 55 starts while the pusher bar 108 is away from its retracted position, the programmable controller 251 will produce an output signal at address 01410 to energize the solenoid valve 81 for closing gate 80 to stop the next subgroup from the orienter 50, so that it does not interfere with operation of the pusher bar 108. When the pusher bar 108 is returned to its retracted position, the programmable controller 251 produces an output signal at address 01411 to actuate the solenoid valve 81 to reopen the gate 80.

When the pusher bar 108 extends to push the last subgroup of the pattern onto the window conveyor 120, the window conveyor 120 will start if certain conditions exist. These conditions are that: (1) an empty container is disposed in its loading position on the support assembly 220, as detected by interruption of the beam of the photo eye 214, to input a signal to the programmable controller 251 at address 11201; (2) the slide plate 161 is in its raised position, as detected by the presence of an output signal at address 01414; and (3) there is no container on the slide plate 161, as indicated by non-interruption of the beam of the photo eye 169 and the consequent absence of an input signal to the programmable controller 251 at address 11203. When these conditions exist, the controller 251 outputs a signal at address 01214, energizing the clutch portion of the solenoid valve 121a to engage the clutch of the motor 121 and start the window conveyor 120. When the window conveyor 120 is moved to a first predetermined position, it closes the limit switch LS-6, producing an input signal to the programmable controller 251 at address 11006, the controller 251 responding to produce an output signal at address 01417 to energize the solenoid valve 109b to retract the pusher bar 108.

Normally, the exit gate 145 of the loader assembly 110 is closed. Thus, as the window conveyor 120 runs, the pattern 23 of articles thereon is stopped against the gate 145 while the conveyor section 130 of the window 120 passes therebeneath. As the window section 132 comes beneath the stopped pattern 24, the pattern drops through the window section 132 into the container held on the support assembly 220. The window conveyor 120 continues to run, and just before the lead roller of the conveyor section 130 arrives at the lower support reach 124, the limit switch LS-7 is closed, inputting a signal to the programmable controller 251 at address 11007. THe controller 251 responds with an output signal at address 01413 to energize the solenoid valve 147a to open the gate 145. As the window conveyor 120 continues to run, the pusher bar 135 at the lead end of the conveyor section 130 engages the filled container and pushes it off the support assembly 220 onto the slide plate 162 of the discharge slide assembly 160. When the window conveyor 120 arrives at its home position, it closes the limit switch LS-5, inputting a signal to the programmable controller 251 at address 11005, whereupon the controller 251 responds with an output signal at address 01215 to energize the brake portion of the solenoid valve 121a to engage the brake of the motor 121 to stop the window conveyor 120.

The presence of the loaded container on the slide plate 161 blocks the beam of the photo eye 169, inputting a signal to the programmable controller 251 and address 11203. When this condition exists, and the window conveyor 120 stops, the slide plate 160 will be lowered if no container is passing therebeneath on the outfeed conveyor 231, as detected by the fact that the beam of the photo eye 235 is clear. More particularly, in this condition, the programmable controller 251 outputs a signal at address 01415 to energize the solenoid valve 166a to lower the slide plate 161, allowing the loaded container to slide down onto the outfeed conveyor 231. When the container leaves the slide plate 161, the beam of the photo eye 169 clears. When the beam of the photo eye 169 is clear while the slide plate 161 is lowered, the controler 251 produces an output signal at address 01414 to energize the solenoid valve 166a to raise the slide plate 161.

Referring now to FIGS. 13A and 13B, the operation of the control circuit 300 for the container handling system 170 will be described. After the container handling system 170 is powered up, the conveyor start switch 311 is closed, inputting a signal to the programmable controller 301 at address 11101. The controller 301 responds by producing output signals at addresses 01010 and 01011 to energize the relays M1 and M2 for starting the drive motors 173a and 234 of the infeed and outfeed conveyors 171 and 231, respectively. If, at any time it is desired to stop the conveyors 171 and 231, the operator depresses the pushbutton stop switch 310, removing an input signal from the programmable controller 301 at address 11100, whereupon the controller 301 responds by terminating the output signals at the addresses 01010 and 01011.

Empty containers travel along the infeed conveyor 171 in the direction of the arrow in FIG. 1. The indexer gate 175 will be open when the following conditions exist: (1) there is no container on the infeed conveyor 171 at the loading station, as detected by the fact that the beam of the photo eye 212 is clear; (2) the lift carriage 190 of the lifter assembly 180 is in its lowered position, as detected by closure of the reed switch 211, inputting a signal to the programmable controller 251 at address 11311; and (3) the stop gate 185 is in its raised or closed position, as detected by the presence of an output signal from the programmable controller 301 at address 01014. When these conditions exist, the lifter assembly 180 is ready to receive an empty container. The photo eye 174 cooperates with other product handling systems 30 when the loading system 20 includes a plurality of systems 30 operated in parallel. When the beam of the photo eye 174 is blocked, it inputs a signal to the programmable controller 301 at address 11300 to signal that a container is available to be fed into the product handling system 30 through the indexer gate 175. When the beam of the photo eye 174 is clear, it signals the system 20 to pass additional containers to the product handling system 30.

When an empty container enters the loading station through the open indexer gate 175 it blocks the beam of the photo eye 212, inputting a signal to the programmable controller 301 at address 11400. The controller 301 responds with an output signal at address 01210 to energize the solenoid valve 178a to close the indexer gate 175.

When the empty container enters the loading station, it is stopped by the stop gate 185, which is in its normally closed position when the photo eye 213 is clear. As the empty container is stopped against the stop gate 185, it blocks the beam of the photo eye 213, inputting a signal to the programmable controller 301 at address 11301. When this happens, the stop gate 185 will open to pass the container onto the next unit of the loading system 20, if the following conditions exist: (1) the product handling system 30 does not require a container, as detected by the fact that the system is powered down, or the beam of the photo eye 214 (FIG. 12B) is blocked, or the container lift safety (to be described below) is activated; (2) the next system 30 downstream requires a container, as indicated by the fact that its photo eye 174 is clear; and (3) the lift carriage 190 is in its lowered position, as detected by closure of the reed switch 211. When all of the conditions exist, the programmable controller 301 outputs a signal at address 01015 to energize the solenoid valve 189b to open the stop gate 185. Otherwise, the stop gate 185 will remain closed.

When the stop gate 185 is closed with an empty container in the loading station, as detected by blocking of the beam of the photo eye 213, the support assembly 220 will open to its release position when the loader assembly 110 requires a container, as detected by the circumstances that: (1) the system 30 is powered up; (2) the beam of the photo eye 214 (FIG. 12B) is clear; and (3) the loader assembly window conveyor 120 is disposed in its home position (limit switch LS-5 is closed). In that situation, the programmable controller 301 produces an output signal at address 01510 to energize the solenoid valve 227a to open the support assembly 220, thereby opening the limit switch LS-8.

If the container lift safety is not activated, the programmable controller 301 responds to opening of the limit switch LS-8 to produce an output signal at address 01012 to energize the solenoid valve 208a to raise the lift carriage 190 and lift the empty container in the loading station to its loading position. When the lift carriage 190 has raised the container to its loading position, it closes the reed switch 210, inputting a signal to the programmable controller 301 at address 11310, the controller 301 responding to produce an output signal at address 01511 to energize the solenoid valve 227a to close the support assembly 220 to its support position in supporting engagement with the raised empty container. The closure of the support assembly 220 to its support position closes the limit switch LS-8, inputting a signal to the programmable controller 301 at address 11500, the controller 301 responding, if the container lift safety is activated, to produce an output signal at address 01013, energizing the solenoid valve 208a to lower the lift carriage 190.

The container handling system 170 includes a container lift safety feature. When the lift carriage 190 starts to raise, an internal timer in the programmable controller 301 is started. If it times out before the lift carriage 190 reaches its raised position (as indicated by closure of the reed switch 210), this indicates that the lift carriage 190 has been jammed. In response the system operates to lower the lift carriage 190 and lock the indexer gate 175 closed until the saftety is reset. The stop gate 185 opens when the downstream units signify that they can receive a container. The support assembly 220 does not close to its support position. When the stop gate 185 opens and the beam of the photo eye 213 clears, the safety resets.

The loading system 20 may include a number of additional alarm and safety features, which are covered in the Microfiche Appendix but which, for simplicity, have been omitted from the control circuits 250 and 300 as illustrated in the drawings. Thus, an infeed safety will activate to stop the infeed conveyor 31 and the window conveyor 55 and activate appropriate alarms in the event that articles jam at gate 40 preventing the photo eye 45 from detecting a gap to effect a count.

A unit full alarm will be activated and the infeed staging conveyor 31 will be stopped when the loading system 20 is full, i.e., when there are subgroups 23 present at the gate 43, on the turntable 54 and on the loader input conveyor 71 in front of the pusher bar 108 and the gates 40 and 80 are closed and the orienter window conveyor 55 is in its home position. The alarm condition resets automatically when the full conditions is alleviated.

A container needed alrm will be activated when the loader assembly window conveyor 120 has a full pattern 24 on its conveyor section with the pusher bar 108 extended, but no empty container is in its loading position on the support assembly 220.

If the window conveyor 120 jams, so that it does not complete a cycle within a specified time set by an internal timer in the programmable controller 251, suitable alarms will be activated and the product handling system 30 will be shut down.

A discharge slide alarm will be activated if the slide plate 161 lowers and cannot raise because the photo eye 169 remains blocked. This could happen if the loaded container somehow sticks on the slide plate 161 and does not slide therefrom onto the outfeed conveyor 231.

If any of the motors become overloaded, a suitable alarm will be activated and the system 20 will be shut down.

When the product handling system 30 is to be shut down, this is effected by actuation of the power down switch 253. Alternatively, in an emergency situation, the system can be shut down by actuation of the emergency stop switch 252, which will result in an suitable indication of the emergency condition. Alternatively, the motors 37, 56, 59, 78 and 121 can be turned off without powering down the rest of the system by actuation of the switch 260. Similarly, the container handling system 170 can be shut off by actuation of the power down switch 303. Alternatively, the container conveyors 171 and 231 can be shut off without powering down the rest of the system by actuation of the stop switch 310.

From the foregoing, it can be seen that there has been provided an improved container loading system, which is uniquely adaptable for operation of a plurality of product handling systems in parallel, all being serviced by a common container handling system.

We claim:

1. Apparatus for loading product into a container comprising: support means for holding a container in a loading position, endless loading means movable along an endless path having a substantially horizontal lower reach disposed immediately above said loading position, said loading means including a conveyor section for supporting product and a window section for allowing product to drop therethrough, transfer means for moving product onto said conveyor section when said conveyor section is disposed along said lower reach of said endless path, shifting means for shifting the product from said conveyor section through said window section and into a container supported in said loading position when the loading means moves in a predetermined direction along said endless path, and discharge means carried by said loading means and effective, upon continued movement thereof along said path, for moving the loaded container from said loading position.

2. The apparatus of claim 1, wherein said transfer means includes means for moving product onto said conveyor section in a direction laterally thereof.

3. The apparatus of claim 2, wherein said transfer means includes input means disposed alongside said lower reach at the level thereof, and pusher measn operable for sliding product from said input means onto said conveyor section of said loading means.

4. The apparatus of claim 2, wherein each container accommodates plural product elements, said transfer means being repeatedly operable for moving plural product elements onto said conveyor section for loading as a group into a container.

5. The apparatus of claim 1, wherein said loading means includes a roller conveyor wherein said conveyor section comprises a flight of free rollers and said window section comprises a section devoid of rollers, said discharge means comprises a pusher plate carried by said conveyor section at the leading end thereof and depending therefrom for engagement with the loaded container for pushing the container from said support means.

6. The apparatus of claim 1, wherein said shifting means comprises a discharge gate spanning said lower reach of said endless path adjacent to one end thereof and movable between a stop position and a release position, said gate in the stop position thereof engaging and holding product against movement as said conveyor section passes therebeneath to cause the product to fall through said window section into the container.

7. The apparatus of claim 1, wherein the container had a depth approximately equal to or greater than the height of the product, said loading means including a flexible slide member carried by said conveyor section at the trailing end thereof and depending therefrom to accommoate sliding movement of the product therealong from said conveyor section into the container without tumbling.

8. Apparatus for loading product into a container comprising: delivery means for delivering an empty container to a loading station, handling means at said loading station for moving an empty container from said delivery means to a loading position, support means for receiving and holding an empty container in said loading position, endless loading means movable along an endless path having a substantially horizontal lower reach disposed immediately above said loading position, said loading means including a conveyor section for supporting product and a window section for allowing product to drop therethrough, transfer means for moving product onto said conveyor section when said conveyor section is disposed along said lower reach of said endless path, shifting means for shifting the product from said conveyor section through said window section and into a container supported in said loading position when the loading means moves in a predetermined direction along said endless path, and discharge means carried by said loading means and effective, upon continued movement thereof along said path, for moving the loaded container from said loading position.

9. The apparatus of claim 8, wherein said delivery means includes conveyor means for carrying empty containers to and through the loading station, and stop means at the loading station movable between a stop position for holding a container at the loading station while the delivery conveyor passes therebeneath, and a retracted position permitting containers to pass through the loading station.

10. The apparatus of claim 8, wherein said loading position is disposed above said delivery means at the loading station, said handling means including lifting means for raising the container from said delivery means to said loading position.

11. The apparatus of claim 10, wherein said lifting means includes vertically reciprocating platform means, horizontally reciprocating drive means, and linkage means interconnecting said drive means and said platform means for converting the horizontal motion of said drive means to the vertical motion of said platform means.

12. The apparatus of claim 10, wherein said support means includes a pair of support arms each pivotally movable between a supporting position, respectively supporting adjacent side edges of a container in said loading position, and a retracted position accomodating movement of the container to said loading position.

13. The apparatus of claim 12, and further comprising motive means coupled to said support means for effecting movement thereof between the support and retracted positions thereof.

14. A system for loading groups of articles into a container comprising: infeed means for conveying a series of articles along an infeed path, orienting means for receiving articles from the infeed means and selectively orienting the articles for arrangement of a group of the articles in a predetermined pattern, support means for holding a container at a loading position, endless loading means movable along an endless path having a substantially horizontal lower reach disposed immediately above said loading position, said loading means including a conveyor section for supporting articles and a window section for allowing articles to drop therethrough, transfer means for moving articles onto said conveyor section in said predetermined pattern when said conveyor section is disposed along said lower reach of said endless path, shifting means for shifting the pattern of articles from said conveyor section through said window section into a container supported in said loading position when the loading means moves in a predetermined direction along said endless path, outfeed means for conveying loaded containers along an outfeed path, and discharge means carried by said loading means and effective, upon continued movement thereof along said endless path, for moving the loaded container from said loading position to said outfeed means.

15. The system of claim 14, wherein said infeed means includes grouping means for grouping the articles into subgroups, said orienting means being arranged for receiving and orienting one subgroup at a time.

16. The system of claim 15, wherein said transfer means is adapted for accumulating a predetermined number of subgroups to form an element of the predetermined pattern, said transfer means being operable for sequentially moving a plurality of said pattern elements onto said conveyor section to form said predetermined pattern.

17. The system of claim 14, wherein said outfeed means includes an outfeed conveyor for defining said outfeed path which extends past said loading station; said discharge means including staging means movable between a receiving condition for receiving a loaded container from said loading position and a delivery position for delivering the loaded container to said outfeed conveyor, and means for controlling the operation of said staging means so as to deliver a loaded container to said outfeed conveyor without interfering with other containers which may be on said outfeed conveyor.

18. The system of claim 14, wherein the container has a depth approximately equal to or greater than the height of the product, said loading means including a flexible slide member carried by said conveyor section at the trailing end thereof and depending therefrom to accommodate sliding movement of the product therealong from said conveyor section into the container without tumbling.

19. The system of claim 18, and further comprising container stacking means disposed along said outfeed path downstream thereof from said discharge means, said stacking means including means for forming a stack of loaded containers by receiving each loaded container from said outfeed means and adding it to the bottom of the stack.

* * * * *